(12) United States Patent
Pak et al.

(10) Patent No.: US 11,475,134 B2
(45) Date of Patent: Oct. 18, 2022

(54) BOOTSTRAPPING A DEVICE

(71) Applicant: Arm Limited, Cambridge (GB)

(72) Inventors: Yongbeom Pak, Oulu (FI); Enrique Cordero Blanco, Oulu (FI)

(73) Assignee: Arm Limited, Cambridge (GB)

( * ) Notice: Subject to any disclaimer, the term of this patent is extended or adjusted under 35 U.S.C. 154(b) by 580 days.

(21) Appl. No.: 16/380,110

(22) Filed: Apr. 10, 2019

(65) Prior Publication Data
US 2020/0327233 A1 Oct. 15, 2020

(51) Int. Cl.
*G06F 21/57* (2013.01)
*H04L 9/40* (2022.01)

(52) U.S. Cl.
CPC ........ *G06F 21/575* (2013.01); *H04L 63/0823* (2013.01); *G06F 2221/034* (2013.01)

(58) Field of Classification Search
CPC ............. G06F 21/575; G06F 2221/034; H04L 63/0823
See application file for complete search history.

(56) References Cited

U.S. PATENT DOCUMENTS

| | | |
|---|---|---|
| 5,349,643 A | 2/1994 | Cox et al. |
| 5,872,968 A | 2/1999 | Knox et al. |
| 6,463,535 B1 | 10/2002 | Drews |
| 6,950,660 B1 | 9/2005 | Hsu et al. |
| 7,363,514 B1 | 4/2008 | Behren |
| 7,882,345 B1 | 2/2011 | Christensen |
| 7,971,045 B1 | 6/2011 | Currid et al. |
| 8,108,455 B2 | 1/2012 | Yeager et al. |
| 8,244,845 B2 | 8/2012 | Rao |
| 8,370,491 B1 | 2/2013 | Breau et al. |
| 9,064,117 B1 | 6/2015 | Worsley |
| 9,307,405 B2 | 4/2016 | Curtis et al. |
| 9,860,235 B2 | 1/2018 | Curtis et al. |
| 9,864,735 B1 * | 1/2018 | Lamprecht ............ G06F 16/955 |

(Continued)

FOREIGN PATENT DOCUMENTS

| | | |
|---|---|---|
| AU | 2013/100802 A4 | 7/2013 |
| EP | 2466791 A1 | 6/2012 |

(Continued)

OTHER PUBLICATIONS

Application and File history for U.S. Appl. No. 14/842,065, filed Sep. 1, 2015. Inventors: Sasin et al.

(Continued)

*Primary Examiner* — Zahid Choudhury
(74) *Attorney, Agent, or Firm* — Patterson Thuente Pedersen, P.A.

(57) ABSTRACT

A method of bootstrapping a device by a bootstrap server, the method comprising: receiving, at the bootstrap server from the device, bootstrap data to enable the bootstrap server to determine that the device is to be provisioned with a device account identifier; verifying, at the bootstrap server, that the device is eligible to obtain a device account identifier based on or in response to the bootstrap data; obtaining, at the bootstrap server, a device account identifier assigned to the device based on or in response to the determination that the device is eligible; provisioning, from the bootstrap server to the device, first credential data comprising the device account identifier assigned to the device.

18 Claims, 15 Drawing Sheets

(56) References Cited

U.S. PATENT DOCUMENTS

| | | | |
|---|---|---|---|
| 10,027,646 | B2 | 7/2018 | Curtis et al. |
| 10,129,268 | B2 | 11/2018 | David et al. |
| 10,185,829 | B2 | 1/2019 | Sasin et al. |
| 10,321,311 | B2 | 6/2019 | Sasin et al. |
| 2002/0090085 | A1 | 7/2002 | Vanstone et al. |
| 2003/0028763 | A1 | 2/2003 | Malinen et al. |
| 2005/0010758 | A1 | 1/2005 | Landrock et al. |
| 2006/0053276 | A1 | 3/2006 | Lortz et al. |
| 2006/0075242 | A1 | 4/2006 | Aissi et al. |
| 2006/0104234 | A1 | 5/2006 | Zhang |
| 2006/0117177 | A1 | 6/2006 | Buer |
| 2006/0150241 | A1 | 7/2006 | Huh et al. |
| 2006/0200855 | A1 | 9/2006 | Willis |
| 2006/0259765 | A1 | 11/2006 | Song et al. |
| 2006/0277406 | A1 | 12/2006 | Hashimoto et al. |
| 2007/0011446 | A1 | 1/2007 | Kato et al. |
| 2007/0043608 | A1 | 2/2007 | May et al. |
| 2007/0055867 | A1 | 3/2007 | Kanungo et al. |
| 2007/0130476 | A1 | 6/2007 | Mohanty |
| 2007/0143388 | A1 | 6/2007 | Futa et al. |
| 2007/0220266 | A1 | 9/2007 | Cooper et al. |
| 2007/0220589 | A1 | 9/2007 | Salowey et al. |
| 2008/0034207 | A1 | 2/2008 | Cam-Winget et al. |
| 2008/0130902 | A1 | 6/2008 | Foo Kune et al. |
| 2009/0013177 | A1 | 1/2009 | Lee' et al. |
| 2009/0063851 | A1 | 3/2009 | Nijdam |
| 2009/0086977 | A1 | 4/2009 | Berggren |
| 2009/0129597 | A1 | 5/2009 | Zimmer et al. |
| 2009/0215477 | A1 | 8/2009 | Lee et al. |
| 2009/0276620 | A1 | 11/2009 | McCarron et al. |
| 2009/0287922 | A1 | 11/2009 | Herwono et al. |
| 2009/0313466 | A1 | 12/2009 | Naslund et al. |
| 2010/0304716 | A1 | 12/2010 | Hoeksel et al. |
| 2011/0154454 | A1 | 6/2011 | Frelechoux |
| 2011/0161663 | A1 | 6/2011 | Nakhjiri |
| 2011/0225296 | A1 | 9/2011 | Hong et al. |
| 2012/0042081 | A1 | 2/2012 | Liao et al. |
| 2012/0079031 | A1 | 3/2012 | Matthews et al. |
| 2012/0108207 | A1 | 5/2012 | Schell et al. |
| 2012/0122423 | A1 | 5/2012 | Helmreich |
| 2012/0221725 | A1 | 8/2012 | Schroeder, Jr. et al. |
| 2013/0035067 | A1 | 2/2013 | Zhang et al. |
| 2013/0081113 | A1 | 3/2013 | Cherian et al. |
| 2013/0095789 | A1 | 4/2013 | Keevill et al. |
| 2013/0150105 | A1 | 6/2013 | Clevorn et al. |
| 2013/0160094 | A1 | 6/2013 | Luo |
| 2013/0174241 | A1 | 7/2013 | Cha et al. |
| 2013/0222109 | A1 | 8/2013 | Lim |
| 2013/0310003 | A1 | 11/2013 | Sadhvani et al. |
| 2014/0089652 | A1 | 3/2014 | Cerri et al. |
| 2014/0099916 | A1 | 4/2014 | Mallikarjunan et al. |
| 2014/0165147 | A1 | 6/2014 | Hershberg et al. |
| 2014/0192634 | A1* | 7/2014 | Vadivelu ............... H04W 48/18 370/221 |
| 2014/0289790 | A1 | 9/2014 | Wilson et al. |
| 2014/0330952 | A1 | 11/2014 | Starsinic et al. |
| 2015/0067329 | A1 | 3/2015 | Ben Saied |
| 2015/0071139 | A1 | 3/2015 | Nix |
| 2015/0113592 | A1 | 4/2015 | Curtis et al. |
| 2015/0113599 | A1 | 4/2015 | Curtis et al. |
| 2015/0237031 | A1 | 8/2015 | Neuman et al. |
| 2015/0296470 | A1 | 10/2015 | Kim et al. |
| 2015/0305008 | A1 | 10/2015 | Kim et al. |
| 2015/0319263 | A1 | 11/2015 | Koch et al. |
| 2015/0358824 | A1 | 12/2015 | Kim et al. |
| 2016/0065556 | A1* | 3/2016 | Sasin ................. H04L 63/0823 726/5 |
| 2016/0072808 | A1 | 3/2016 | David et al. |
| 2016/0191489 | A1 | 6/2016 | Curtis et al. |
| 2017/0019427 | A1 | 1/2017 | Vank et al. |
| 2017/0039373 | A1 | 2/2017 | Sasin et al. |
| 2017/0041287 | A1 | 2/2017 | Pak et al. |
| 2018/0152541 | A1* | 5/2018 | Mathison ............... H04L 67/02 |
| 2018/0295119 | A1 | 10/2018 | Curtis et al. |
| 2018/0324168 | A1 | 11/2018 | Curtis et al. |
| 2019/0044957 | A1 | 2/2019 | David et al. |
| 2019/0132309 | A1* | 5/2019 | Wei ........................ H04L 63/126 |
| 2019/0156040 | A1 | 5/2019 | Sasin et al. |
| 2019/0289467 | A1 | 9/2019 | Sasin et al. |
| 2020/0274707 | A1 | 8/2020 | Kiiskilä |
| 2020/0329013 | A1* | 10/2020 | Zhou ..................... H04L 63/062 |

FOREIGN PATENT DOCUMENTS

| | | | |
|---|---|---|---|
| GB | 2533385 | A | 6/2016 |
| KR | 20140113007 | A | 9/2014 |
| WO | WO 2006/059195 | A1 | 6/2006 |
| WO | WO 2009/141493 | A1 | 11/2009 |
| WO | WO 2011/123329 | A1 | 10/2011 |
| WO | WO 2013/049292 | A1 | 4/2013 |
| WO | WO 2014/048236 | A1 | 3/2014 |
| WO | WO 2014/069968 | A1 | 5/2014 |
| WO | WO 2014/114354 | A1 | 7/2014 |
| WO | WO 2014/116152 | A1 | 7/2014 |
| WO | WO 2014/182674 | A1 | 11/2014 |
| WO | WO 2014/190177 | A1 | 11/2014 |
| WO | WO 2015/042370 | A1 | 3/2015 |
| WO | WO 2015/065913 | A1 | 5/2015 |

OTHER PUBLICATIONS

Application and File history for U.S. Appl. No. 15/218,902, filed Jul. 25, 2016. Inventors: Pak et al.

Application and File history for U.S. Appl. No. 15/226,523, filed Aug. 2, 2016. Inventors: Sasin et al.

Search Report dated Mar. 17, 2016 for GB Application No. GB1513750.8, 6 pages.

Examination Report dated Nov. 10, 2017 for Application No. GB1513750.8, 3 pages.

Search Report dated Jan. 12, 2015 for GB Application No. 1415562.6, 5 pages.

"Lightweight M2M": Enabling Device Management and Applications for the Internet of Things, Feb. 26, 2014, Vodafone, Arm and Ericsson, 16 pages.

Examination Report dated Jul. 12, 2018 for Application No. GB1806259.6, 6 pages.

"Public Key Infrastructures and Digital Certificates for the Internet of Things", Schukat et al, 26th Irish Signals and Systems Conference (ISSC), pp. 1-5, IEEE, Jun. 24-25, 2015.

"Security for IoT. An effective DTLS with public certificates", Panwar et al., 2015 International Conference on Advances in Computer Engineering and Applications (ICACEA), pp. 163-166, IEEE, Mar. 19-20, 2015.

Search Report dated Mar. 17, 2016 for GB Application No. 1513748.2, 7 pages.

Application and File history for U.S. Appl. No. 14/056,459, filed Oct. 17, 2013. Inventors: Curtis et al.

Application and File history for U.S. Appl. No. 15/060,639, filed Mar. 4, 2016. Inventors: Curtis et al.

Application and File history for U.S. Appl. No. 14/056,468, filed Oct. 17, 2013. Inventors: Curtis et al.

Application and File history for U.S. Appl. No. 14/056,423, filed Oct. 17, 2013. Inventors: Curtis et al.

Application and File history for U.S. Appl. No. 16/009,277, filed Jun. 15, 2018. Inventors: Curtis et al.

Application and File history for U.S. Appl. No. 16/035,765, filed Jul. 16, 2018. Inventors: Curtis et al.

Application and File history for U.S. Appl. No. 14/843,420, filed Sep. 2, 2015. Inventors: David et al.

Partial International Search Report dated Jan. 29, 2015 for PCT Application No. PCT/GB2014/053098, 5 pages.

International Search Report and Written Opinion dated Jan. 30, 2015 for PCT Application No. PCT/GB2014/053096, 12 pages.

International Search Report and Written Opinion dated Jan. 30, 2015 for PCT Application No. PCT/GB2014/053097, 15 pages.

International Search Report and Written Opinion dated Apr. 8, 2015 for PCT Application No. PCT/GB2014/053098, 20 pages.

International Preliminary Report on Patentability dated Apr. 28, 2016 for PCT Application No. PCT/GB2014/053098, 14 pages.

(56) References Cited

OTHER PUBLICATIONS

International Preliminary Report on Patentability dated Apr. 28, 2016 for PCT Application No. PCT/GB2014/053097, 10 pages.
International Preliminary Report on Patentability dated Apr. 28, 2016 for PCT Application No. PCT/GB2014/053096, 9 pages.
HP Device Registration Repository Capability; M2M06-014 Device Registry Repository Capability; ETSI Draft; M2M06-014 Device Registry Repository Capability; European Telecommunications Standards Institute, 650, Route Des Lucioles; F-06921 Sophia-Antipolis; France, vol. SmartM2M, Oct. 13, 2009, pp. 1-2, XP014207713.
[Internet Citation], Certicom Device Certification Authority for ZigBee Smart Energy, *Certicom Corp.*, http://www.certicom.com/index.php/device-authentication-service/smart-energy-device-certificate-service, Oct. 1, 2013, printed on Oct. 16, 2013, 2 pages.
Search Report dated Mar. 18, 2015 for GB Application No. 1415861. 2, 3 pages.
First Office Action dated Dec. 29, 2018 for Chinese Application No. 201480056752.8, 38 pages.
Second Office Action dated May 17, 2019 for Chinese Application No. 201480056752.8, 9 pages.

* cited by examiner

BOOTSTRAPPING A DEVICE

The present techniques generally relate to a bootstrap mechanism for devices.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT).

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved techniques for provisioning data on devices.

According to a first technique there is provided a computer implemented method of bootstrapping a device by a bootstrap server, the method comprising: receiving, at the bootstrap server from the device, bootstrap data to enable the bootstrap server to determine that the device is to be provisioned with a device account identifier; verifying, at the bootstrap server, that the device is eligible to obtain a device account identifier based on or in response to the bootstrap data; obtaining, at the bootstrap server, a device account identifier assigned to the device based on or in response to the determination that the device is eligible; provisioning, from the bootstrap server to the device, first credential data comprising the device account identifier assigned to the device.

According to a further technique there is provided a bootstrap server to: receive bootstrap data from a device; determine that the device is to be provisioned with a device account identifier based on or in response to the bootstrap data; verify that the device is eligible to obtain a device account identifier based on or in response to the bootstrap data; obtain a device account identifier assigned to the device based on or in response to the determination that the device is eligible; provision to the device, first credential data comprising the device account identifier assigned to the device.

According to a further technique there is provided a computer implemented method of bootstrapping a device, the method comprising: transmitting, from the device to a bootstrap server, bootstrap data to enable the bootstrap server to determine that the device is eligible to be assigned an account identifier; receiving, at the device from the bootstrap server, first credential data comprising a device account identifier assigned to the device.

According to a further technique there is provided a device comprising bootstrap data to enable a server to determine that the device is eligible to be assigned an account identifier; the device to transmit the bootstrap data to a bootstrap server and receive first credential data comprising a device account identifier.

According to a further technique there is provided a computer implemented method of assigning account identifiers to a device, the method comprising: receiving, at a device management platform, bootstrap data to enable the device management platform determine that the device is to be provisioned with a device account identifier; verifying, at the device management platform, that the device is eligible to obtain the device account identifier based on or in response to the bootstrap data; assigning, at the device management platform, a device account identifier to the device based on or in response to the determination that the device is eligible; provisioning, from the device management platform to the device, first credential data comprising the device account identifier assigned to the device.

According to a further technique there is provided a device management platform to: receive bootstrap data from a device and determine that the device is to be provisioned with a device account identifier; verify that the device is eligible to obtain the device account identifier based on or in response to the bootstrap data; assign a device account identifier to the device based on or in response to the determination that the device is eligible; provision to the device, first credential data comprising the device account identifier.

According to a further technique there is provided a non-transitory computer readable storage medium comprising code which when implemented on a processor causes the processor to carry out the method of any one of the claims.

According to a further technique there is provided a device to perform the method of any one of the claims.

The techniques are diagrammatically illustrated, by way of example, in the accompanying drawings, in which.

Figure 3:
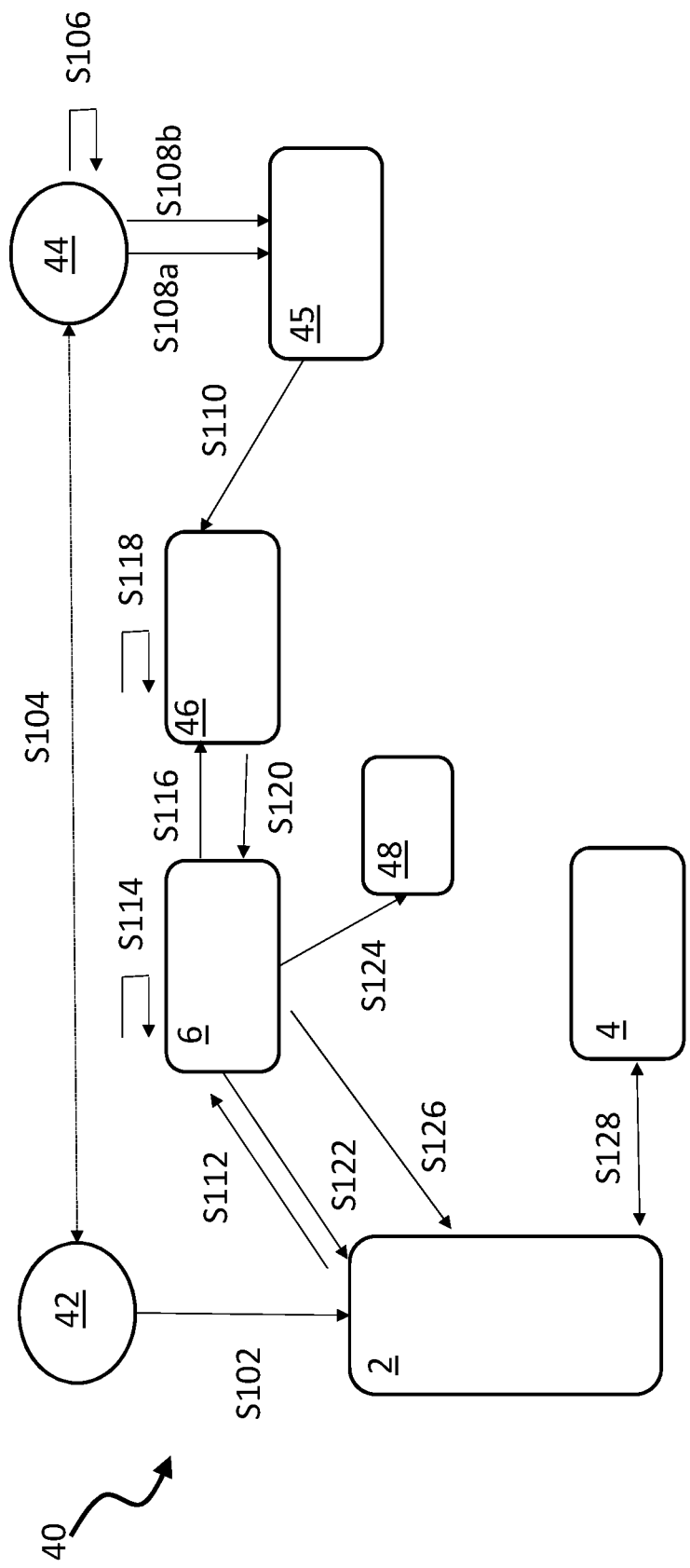
Figure 4:
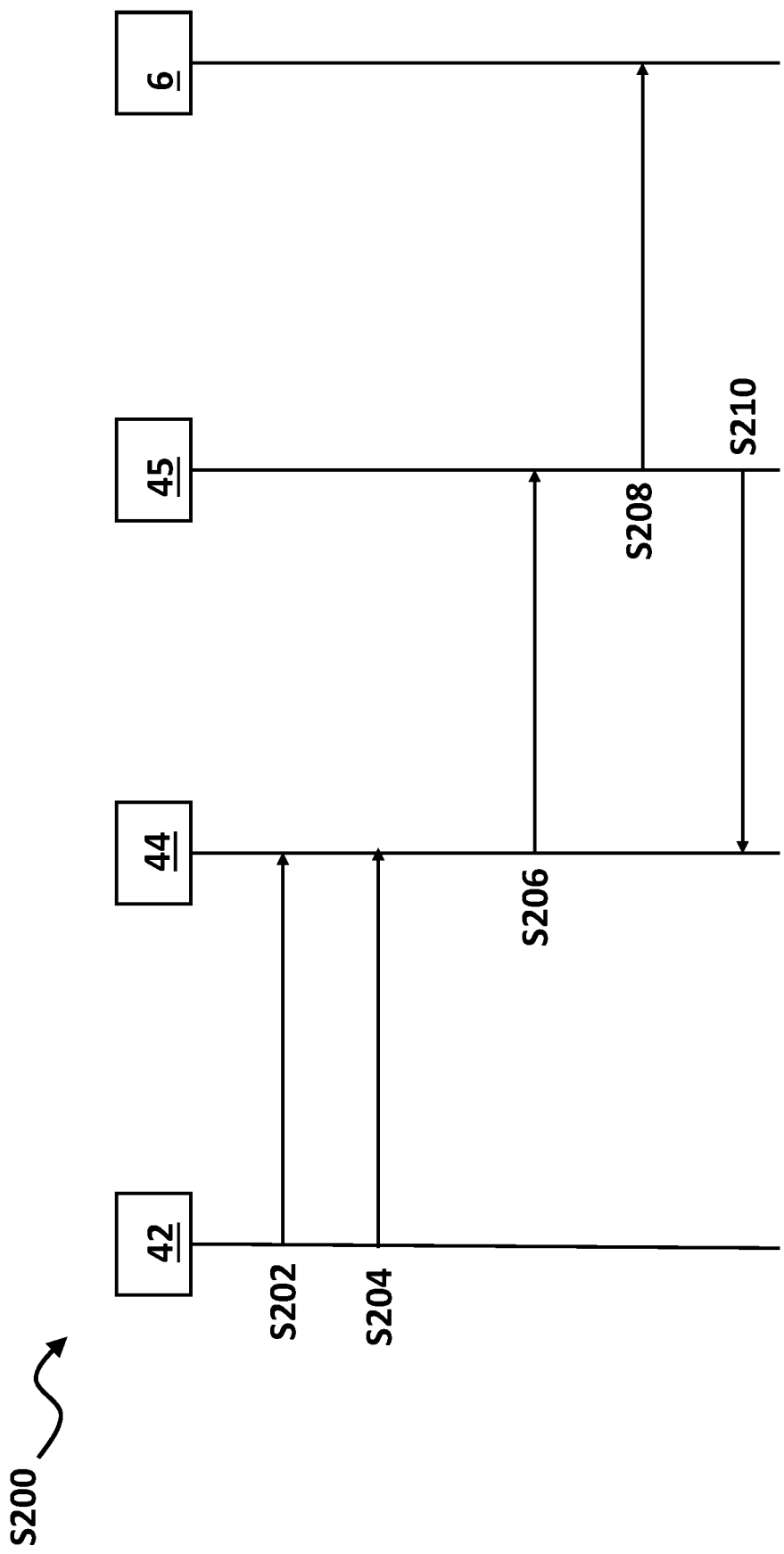
Figure 5:
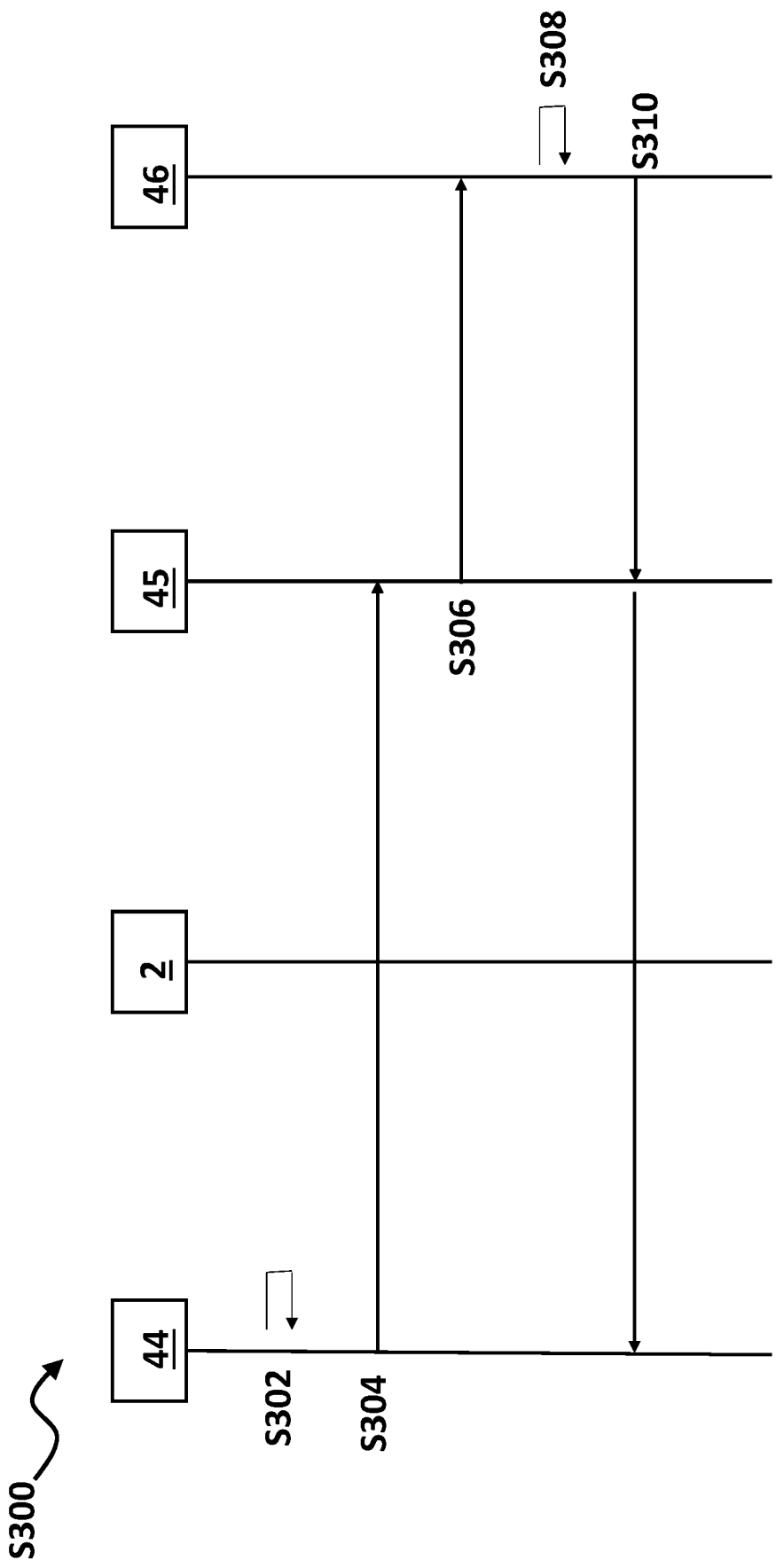
Figure 6A:
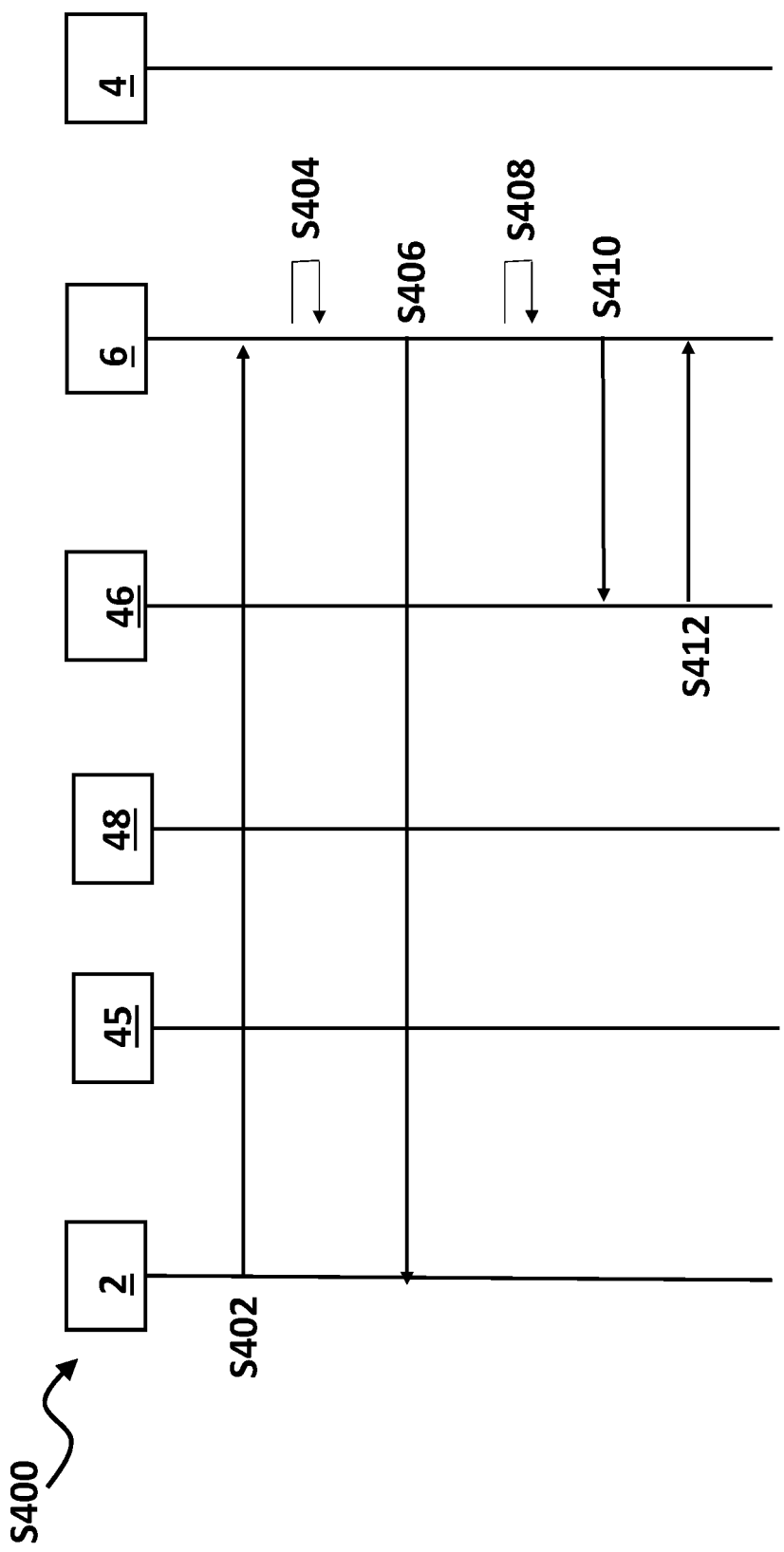
Figure 6B:
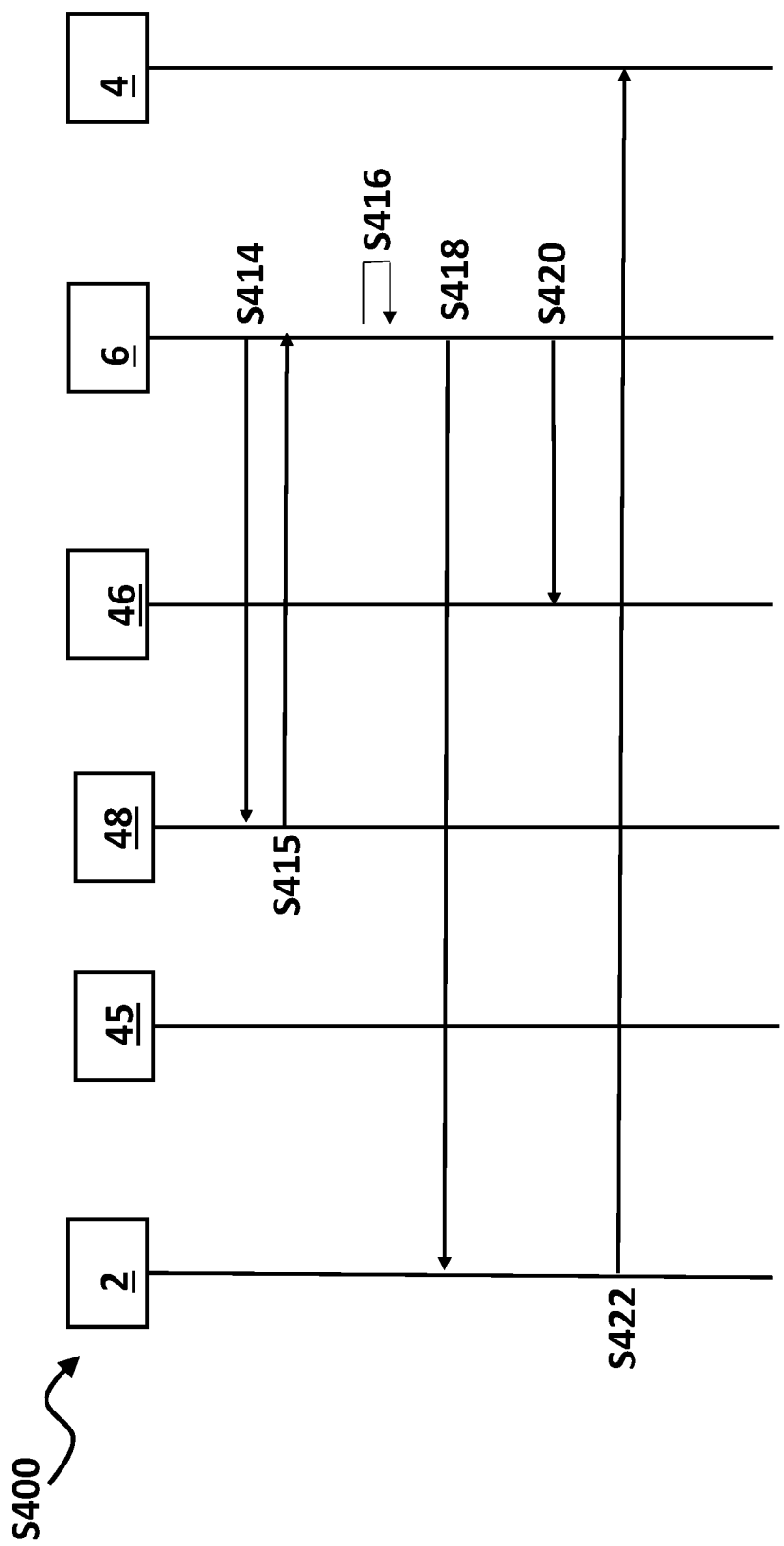
Figure 7:
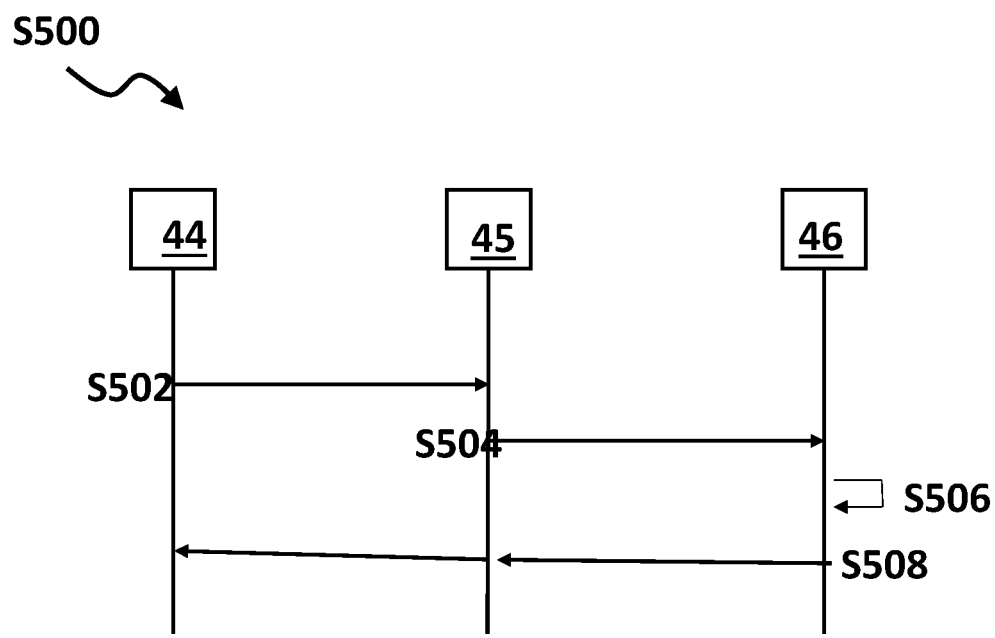
Figure 8:
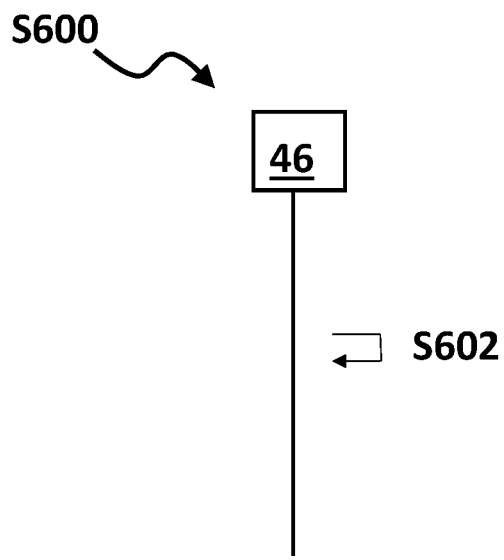
Figure 9:
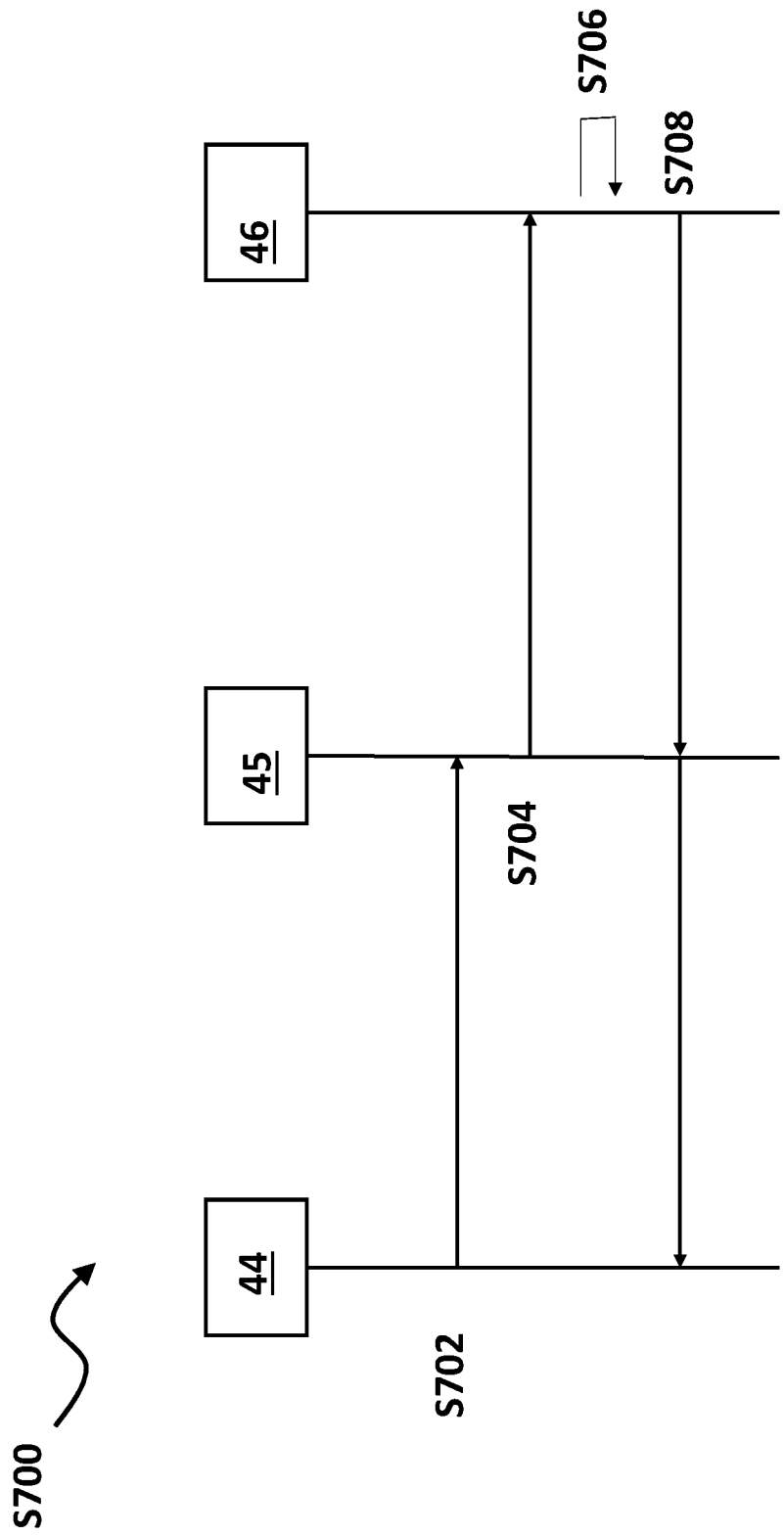
Figure 10A:
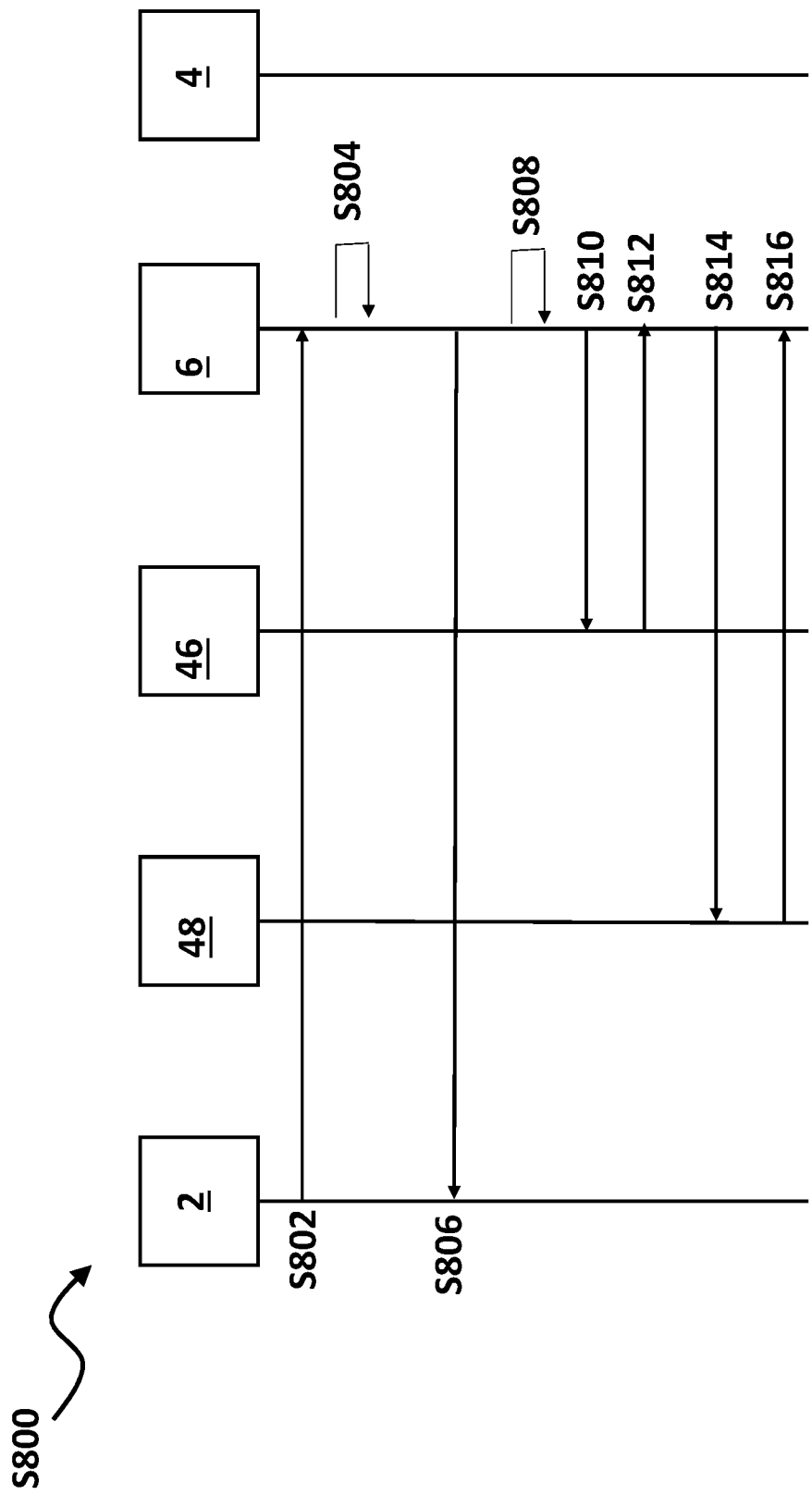
Figure 10B:
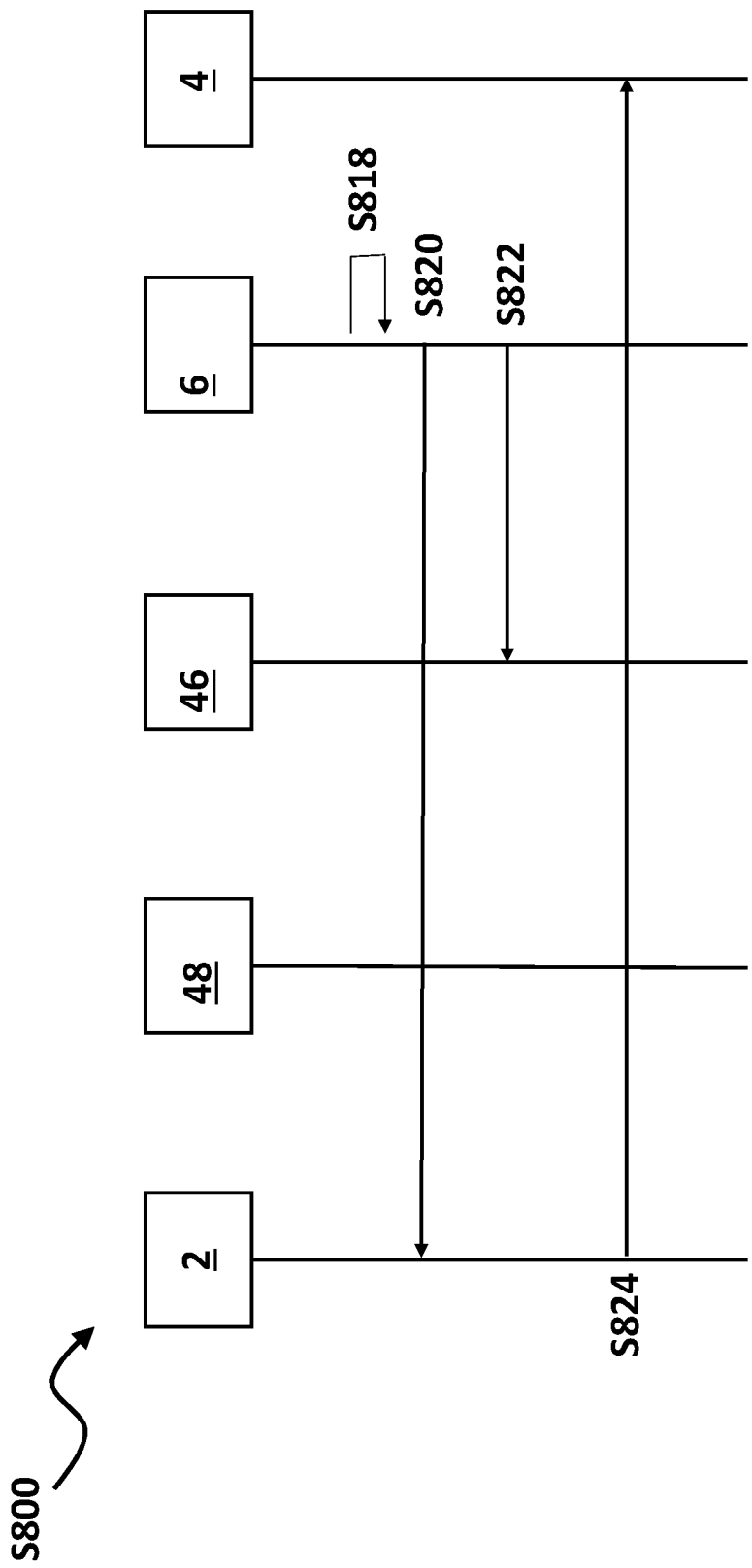
Figure 11A:
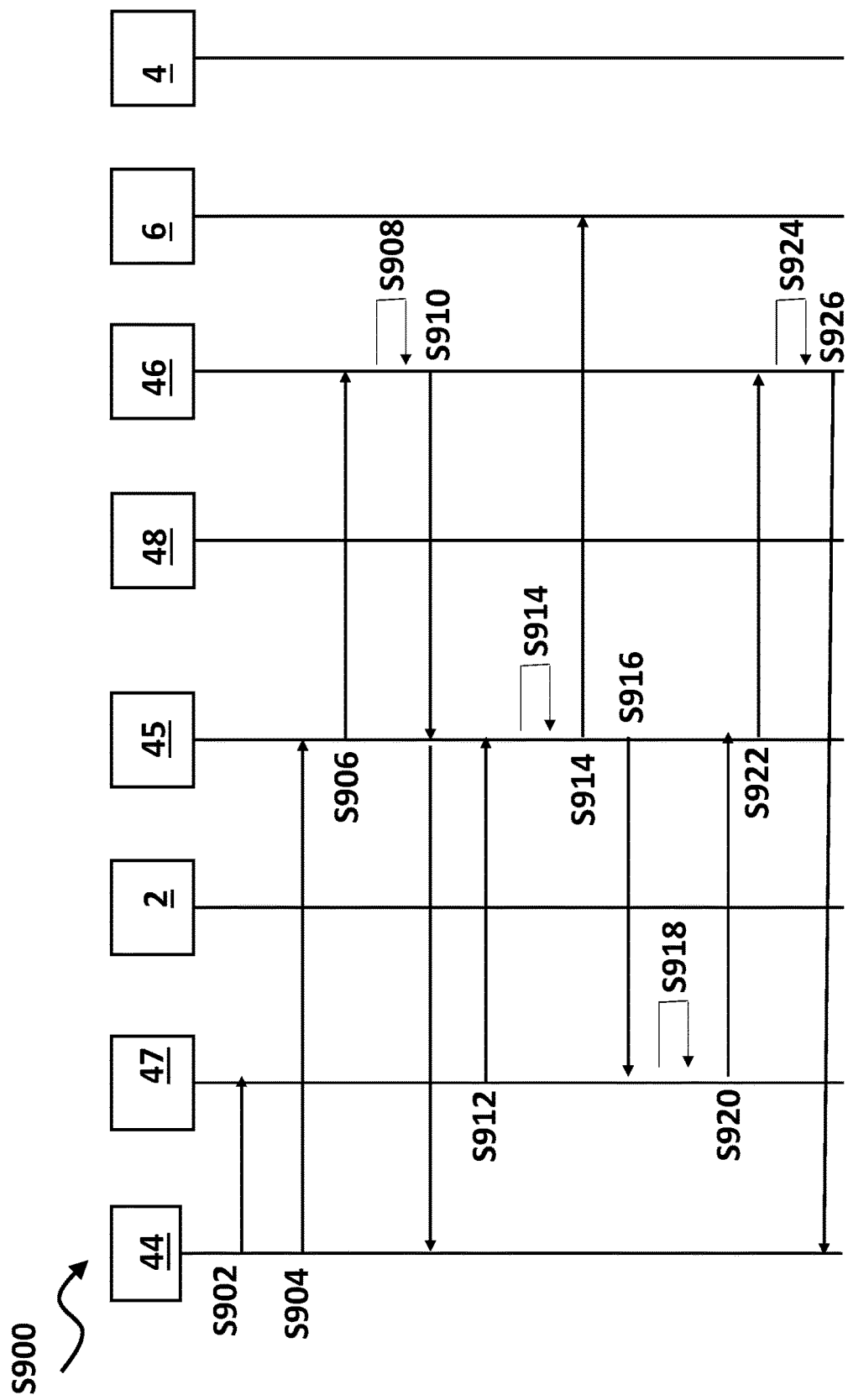
Figure 11B:
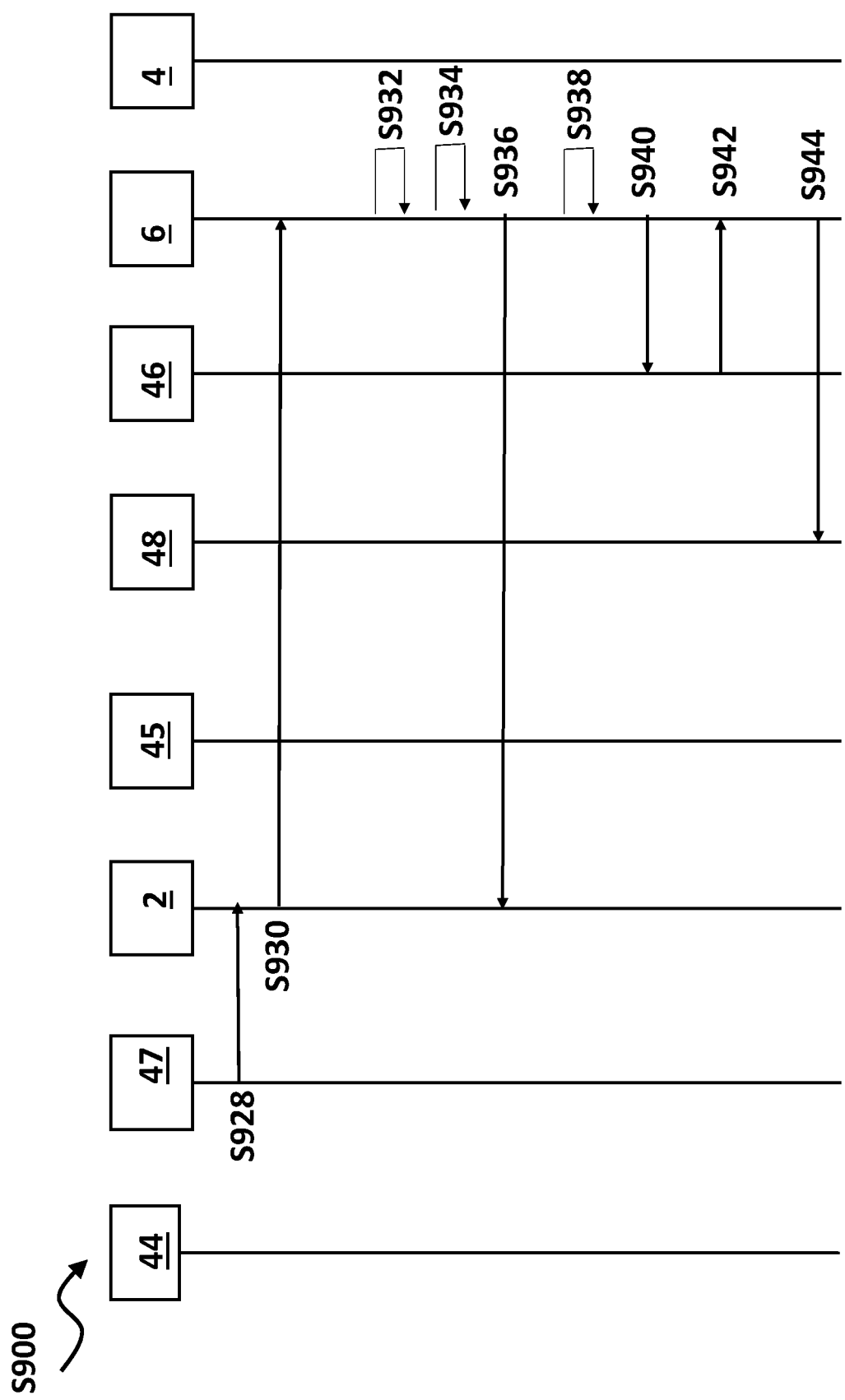

FIG. 3 illustratively shows an example of assigning a device account identifier to a device;

FIG. 4 illustratively shows an example process in which a device owner uploads a certificate to a device management platform;

FIG. 5 illustratively shows an example process in which the device owner enrolls a device at the device management platform;

FIG. 6a illustratively shows a first part of an example process in which a device account is assigned to the device;

FIG. 6b illustratively shows a second part of the example process in which a device account is assigned to the device;

FIG. 7 illustratively shows an example process in which the device owner deletes the device from device management platform;

FIG. 8 illustratively shows an example process in which the enrolment identifier exceeds a threshold time limit;

FIG. 9 illustratively shows an example process in which the device owner can view devices enrolled at the device management platform;

FIG. 10a illustratively shows a first part of an example process in which device bootstraps after a reset;

FIG. 10b illustratively shows a second part of the example process of 10a;

FIG. 11a illustratively shows a first part of an example process in which ownership of the device is transferred from the device owner to a second device owner;

FIG. 11b illustratively shows a second part of the example process of 11a; and

Figure 11C:
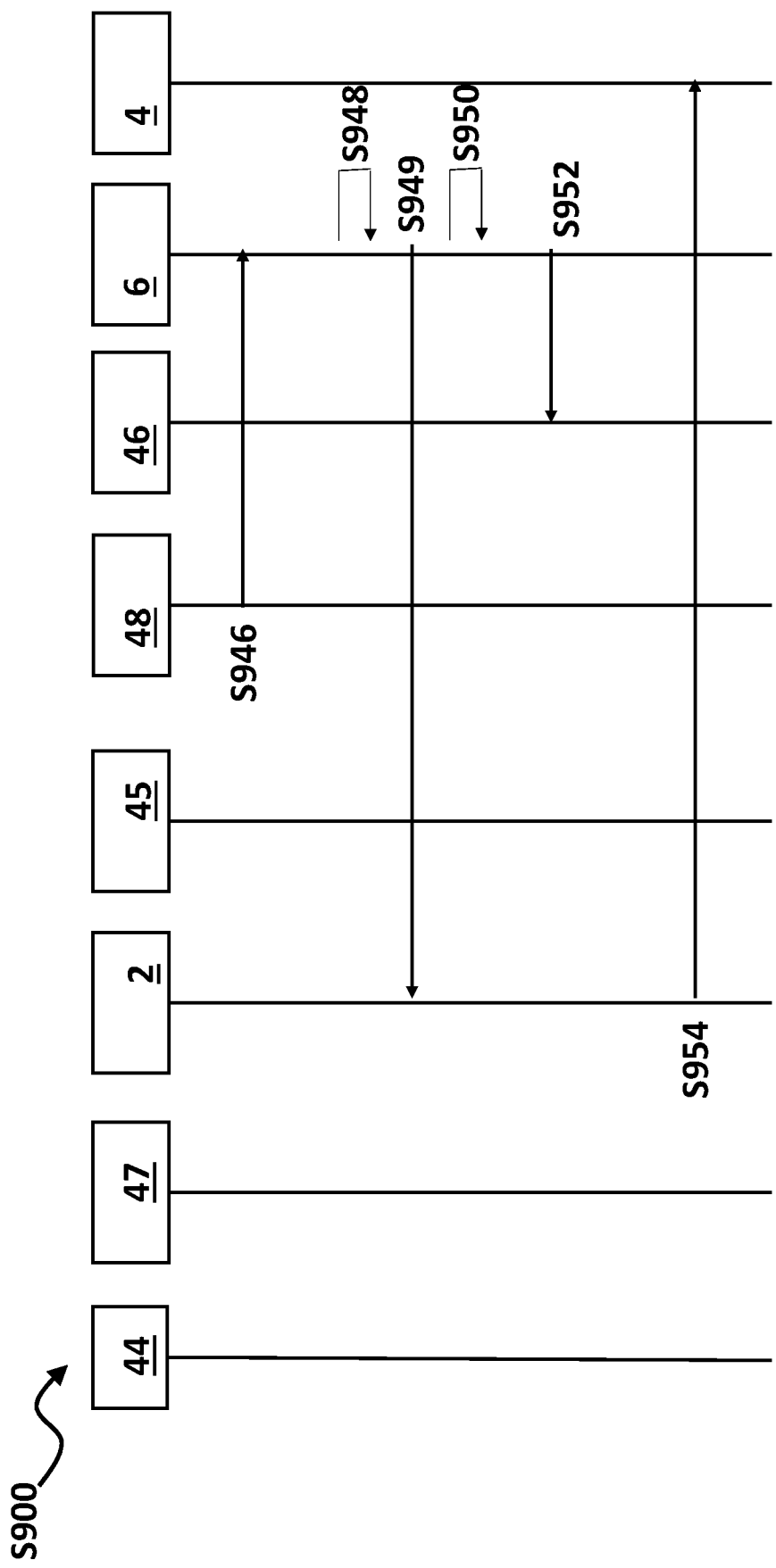

FIG. 11c illustratively shows a third part of the example process of 11a.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
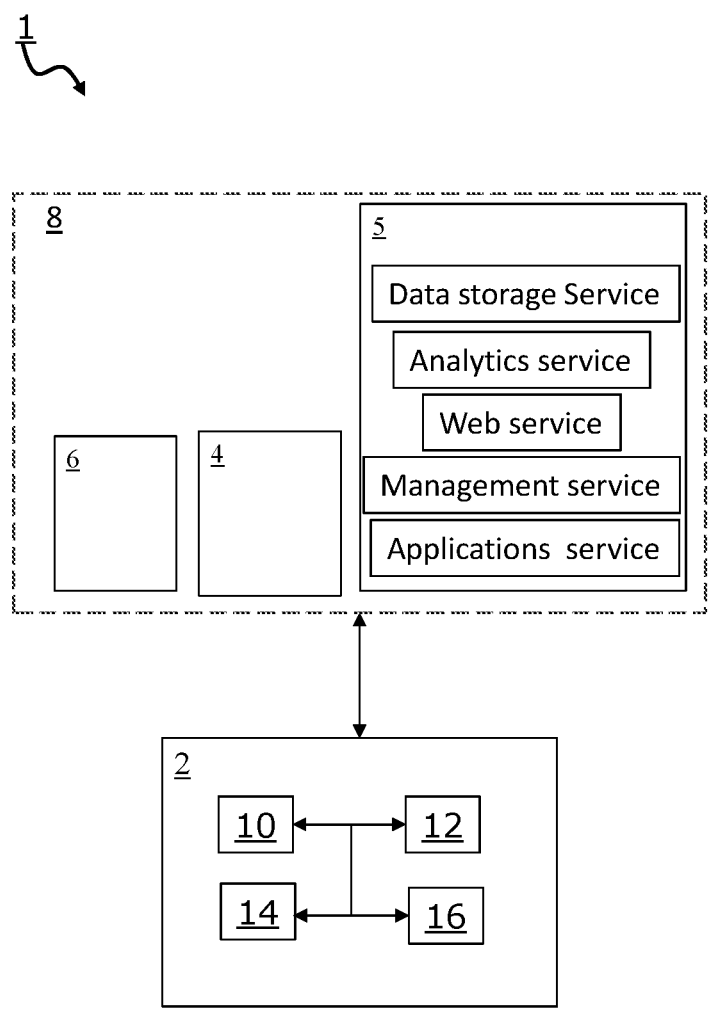
FIG. 1 shows an example deployment scenario for a device according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device running a LwM2M client. Device 2 can be used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks.

In the present figures, server 4 (hereafter "resource server") may, for example, be a LwM2M server, an application server, an edge server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures server 6 comprises a bootstrap server which is used to provision resources at the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the resource server 4, bootstrap server 6 and/or services 5 are depicted as being part of a device management platform 8, such as the Pelion™ device management platform from Arm®, Cambridge, UK.

The device 2 comprises communication circuitry 10 for communicating with the one or more servers 4, 6 and/or services 5.

The communication circuitry 10 may use wireless communication such as, for example, one or more of: Wi-Fi; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, Web Socket, ZigBee®, Thread® although it will be appreciated that these are examples of suitable protocols.

As an illustrative example, CoAP defines the message header, request/response codes, message options and retransmission mechanisms, such as, for example, RESTful Application Programming Interfaces (APIs) on resource-constrained devices and supports the methods of GET, POST, PUT, DELETE, which can be mapped to methods of the HTTP protocol.

M2M communications are typically required to be secure to reduce the risk that malicious third parties gain access to the data, or to limit the access to data, by devices, servers or services. The device may use one or more security protocols to establish a communications path or channel for providing secure communications between entities. Exemplary security protocols may, for example, comprise Transport Layer Security (TLS) and Datagram Transport Layer Security (DTLS), whereby TLS/DTLS may be used to establish a secure channel between the device 2 and resource server 4 whereby TLS/DTLS include establishing communications using, certificates (e.g. X.509 certificates) and both pre-shared key and public key technology. The data (e.g. credential data) protected by TLS/DTLS may be encoded as plain text, binary TLV, JSON, CBOR, or any other suitable data exchange format.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing resources, such as credential data, whereby the storage circuitry 16 may comprise volatile and/or non-volatile memory.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enroll etc.) with one or more remote entities (e.g. a bootstrap server/server/services).

Figure 2A:
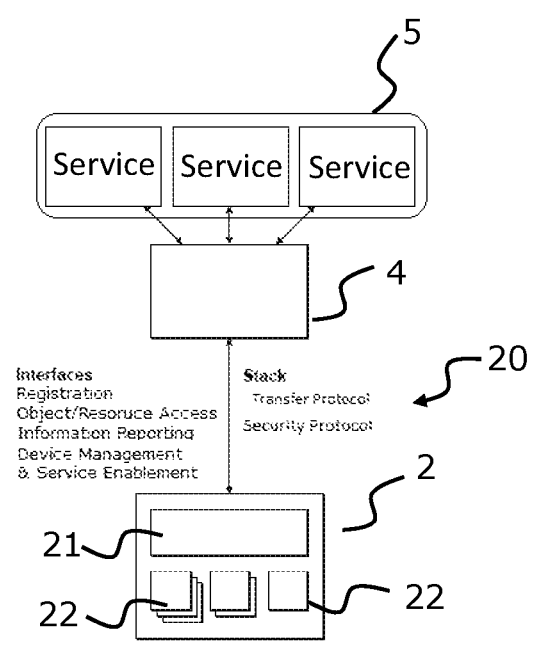
FIG. 2a shows an example architecture depicting a client-server relationship between the device of FIG. 1 and a server.
Figure 2B:
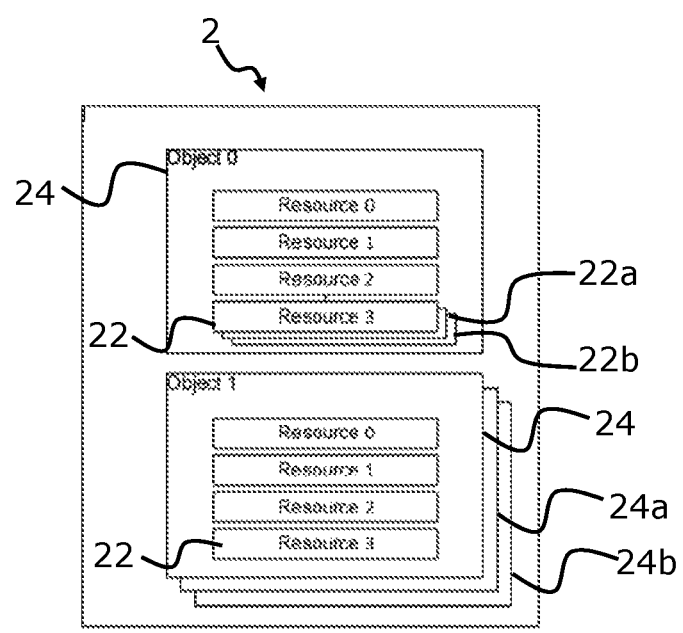
FIG. 2b shows a schematic diagram of an object model on the device of FIG. 1.

FIG. 2a illustratively shows an example architecture 20 which illustrates a client-server relationship between the device 2 and resource server 4. FIG. 2b illustratively shows a schematic diagram of an object model of device 2.

In embodiments, the resource server 4 may be a LwM2M server, such that the resource server 4 and client device 2 communicate using suitable protocols, such as those in compliance with the Open Mobile Alliance (OMA) LWM2M specification although the claims are not limited in this respect.

The client device 2 comprises client 21 which may be integrated as a software library or a built-in function of a module and which is used in communications with the resource server 4. The client 21 may be an LwM2M client.

Logical interfaces may be defined between the client 21 and resource server 4, and three logical interfaces are depicted in FIG. 2, namely:

'Client Registration' interface may be used to perform and maintain registration with one or more LwM2M servers and de-register from one or more LwM2M servers.

'Device management and service enablement' interface may be used by one or more servers to access object(s), object instances and resources available at the client device 2.

'Information Reporting' interface may be used to enable one or more servers to observe any changes in a resource on client device 2, and for receiving notifications when new values are available.

This list of logical interfaces is exemplary only and additional, or alternative, logical interfaces between the client 21 and resource server 4 may be provided, for example, in accordance with the OMA LwM2M specification.

The device 2 comprises various resources 22, which can be read, written, executed and/or accessed by the resource server 4 or one or more further servers/services.

As an illustrative example, a resource 22 may comprise a value (e.g. generated by circuitry on the device). A web application may, via resource server 4, request the value from the client device 2 (e.g. with a REPORT request), whereby the requested value is read and reported back to the web application by the resource server 4.

As a further illustrative example, a resource 22 may comprise credential data provisioned at manufacture (e.g. during a factory provisioning process) or during a communication session with a bootstrap server, and subsequently used to register with the resource server 4.

As depicted in FIG. 2b, the resources 22 may be further logically organized into objects 24, whereby each device 2 can have any number of resources, each of which is associated with a respective object 24.

A set of objects on client device 2 may include, for example:

A 'security object' to handle security aspects between the client device 2 and one or more servers;

A 'server object' to define data and functions related to a server;

An 'access control object' to define for each of one or more permitted servers the access rights the one or more servers have for each object on the client device 2;

A 'device object' to detail resources on the client device 2. As an example, the device object may detail device information such as manufacturer, model, power information, free memory and error information;

A 'connectivity monitoring object' to group together resources on the client device 2 that assist in monitoring the status of a network connection;

A 'firmware update object' enables management of firmware which is to be updated, whereby the object includes installing firmware, updating firmware, and performing actions after updating firmware;

A 'location object' to group those resources that provide information about the current location of the client device 2;

A 'connection statistics object' to group together resources on the client device 2 that hold statistical information about an existing network connection.

In embodiments device 2 may have one or more instances of an object, three of which are depicted as 24, 24a and 24b in FIG. 2b. As an illustrative example, a temperature sensor device may comprise two or more temperature sensors, and the client device 2 may comprise a different device object instance for each temperature sensor.

In embodiments a resource may also comprise one or more resource instances which are depicted as 22, 22a, 22b in FIG. 2b.

In embodiments the objects, object instances, resources and resource instances can be read, written or executed and accessed with, for example URIs:

/{Object ID}/{Object Instance]/[Resource ID} e.g. /3/0/1.

One or more of the objects, object instances, resources and resource instances may be provisioned, for example, at manufacture (e.g. during a factory provisioning process) or by a bootstrap server 6.

On registration with a resource server 4 the device 2 is assigned or bound to an account (hereafter "device account") at the device management platform and is required to present a device account identifier when communicating with a server (e.g. bootstrap server or resource server), so that the server can determine which of the one or more services 5 at the device management platform that device 2 is authorised to access.

In known techniques, the device account identifier is provisioned on the device at manufacture before leaving the factory, such that when powered on for the first time the device can use bootstrap data to authenticate with a bootstrap server which can provision the necessary resource credentials to enable the device to authenticate with a resource server at the device management platform and access the one or more services authorised for that account.

Such functionality means that a device manufacturer will, for every device it manufacturers, have knowledge of which account each particular device is to be assigned to, and assign a corresponding device account identifier.

In known scenarios where a device manufacture does not have knowledge of which account a particular device is to be assigned to, the device account identifier will be configured after the device is deployed. However, configuring the device account identifier post-deployment has potential security flaws in that the device may be hacked prior to being assigned the device account identifier, and the device subsequently used in an attack on the resource server (or bootstrap server) with which it authenticates.

Exploitation of such a security flaw may be mitigated by the device proving that it is a trusted entity by presenting to the bootstrap server a trusted certificate linked to the account associated with the device account identifier. However, the device is required to be provisioned with the trusted certificate linked to the account prior to bootstrapping, which imposes logistical challenges.

Whilst the requirement for proving the device is trusted can be disabled, whereby the bootstrapping server can provision the device account identifier without requiring the device to present a trusted certificate, any party could potentially take control of the device and use the device in an attack (e.g. Denial of Service (DoS) attack, or a distributed (DDoS) attack) on the service to which the device account data corresponds.

Configuring the device account identifier and providing a trust certificate post-deployment also imposes logistical burdens because an authorised person is required to spend time configuring the account identifier before the device can perform the bootstrap process.

Therefore, there is a requirement for a bootstrapping process in which the device can be provided with a device account identifier in a secure manner post-manufacture.

FIG. 3 schematically shows a block diagram of a system 40 in which a device 2 uses credential data comprising bootstrap data to authenticate with a bootstrap server 6 and to obtain further credential data including a device account identifier to authenticate with resource server 4 and access one or more services authorised for the associated account.

At S102, a first party 42, which may be a manufacturer, such as an original equipment manufacturer, (hereafter "OEM"), creates a device and provisions on the device: an OEM CA certificate (hereafter OEM certificate) having a chain of trust to a root authority; and bootstrap data comprising a bootstrap certificate created from the OEM CA certificate (e.g. having a public key signed with a private key of the CA certificate). As will be appreciated the OEM certificate and bootstrap certificate enables an entity (e.g. a bootstrap server) to determine whether the respective OEM and bootstrap certificates should be trusted. The OEM certificate may have a chain of trust to a Certificate Authority (CA) such as GlobalSign or VeriSign. The OEM and bootstrap certificates may be X.509 certificates, although the claims are not limited in this respect.

In embodiments the bootstrap data may also comprise a device identifier for the device 2 (e.g. UUID, GUID etc).

The device 2 is subsequently obtained by a second party 44 having ownership rights for the device. In embodiments the second party 44 may be an administrator of the device management platform from which the device 2 accesses a service, a service provider providing the device 2 to end users, or the end users of the device 2. In the present description the second party 44 is hereafter referred to as "device owner".

The device 2 is not yet provisioned with a device account identifier and is therefore not bound to an account at the device management platform but will require such a device account identifier in order to be able to access one or more services at the device management platform.

Thus, when the device owner obtains the device they must perform various steps to obtain the device account identifier.

At S104, the device owner obtains instructions to enable the device owner to obtain the device account identifier. Such instructions may be provided as part of packaging or a manual accompanying the device or sent to the device owner as a hyperlink on obtaining the device, or the instructions may be provided on the device itself (e.g. printed) or whereby the device owner may scan a barcode (e.g. a QR code), near field communications (NFC) tag, or a radio frequency identification code (RFID) code on the device to obtain the instructions.

For the present techniques the OEM certificate does not provide a chain of trust from the device (or device owner) to the trusted CA. As such, an entity (e.g. a bootstrap server) receiving the OEM certificate from a device may require another way of determining whether the device is trusted.

The present techniques describe using an enrolment process for such a determination.

The OEM certificate is configured so as to be able to use the OEM certificate as part of the enrolment process. In an embodiment a factory configurator utility (FCU) may be used to generate and configure the OEM certificate and provide the OEM certificate to the device owner.

Additionally, or alternatively, a device owner may configure the OEM certificate, whereby, as at S106, the device owner may configure the OEM certificate via a device management platform portal 45 (hereafter "portal" 45). As will be appreciated the device owner may log into an account associated therewith via the portal 45 using, for example, an application (e.g. web application) on an associated computing device.

The portal 45 may comprise an application programming interface (API) gateway (GW), which may be a representational state transfer (REST) API, to provide communications between the device owner and/or different servers/services at the device management platform.

In embodiments the portal 45 may manage the storage and distribution of credential data (e.g. enrolment identifiers, device account identifiers, certificates, etc.) between the device owner and different services/services at the device management platform. In an illustrative example the portal 45 may provide the OEM certificate, uploaded thereto by the device owner, to the bootstrap server 6.

At S108a, the device owner 44 adds, via the portal 45, an enrolment identifier for the device 2 to an account associated with the device owner (hereafter "device owner account") at the device management platform.

The enrolment identifier may be obtained by the device owner by following instructions obtained by the device owner and may comprise one or more characters (e.g. ASCII characters, binary characters etc), but is preferably globally unique for the device 2.

In an illustrative example the enrolment identifier may comprise a fingerprint of the bootstrap certificate provisioned on the device, whereby the fingerprint may be calculated using SHA256 hash of DER (Distinguished encoding rules) format of the certificate. The fingerprint may be encoded as hexadecimal in ASCII to provide simple integration of using existing tool like OpenSSL. In an embodiment the FCU may create the enrolment identifier, whereby the OEM may transmit the enrolment identifier to the device owner.

At S108b the device owner uploads the OEM certificate to the device management platform via the portal 45, whereby the OEM certificate is registered with the device management platform as a trusted CA and is to be used by the bootstrap server to verify certificates presented by the device 2.

At S110 the enrolment identifier for the device 2 is enrolled with an enrolment service 46 at the device management platform, whereby the enrolment identifier for the device is linked to the device owner account at the device management platform. As will be appreciated, the device owner may obtain multiple devices (e.g. >1000 device) and enroll enrolment identifiers for each device with the enrolment service.

The enrolment service 46 comprises a database to store enrolment identifiers uploaded by one or more device owners. The enrolment service 46 may also assign device account identifiers for devices corresponding to the respective enrolment identifiers.

At S112 the device 2 initiates a bootstrap process with the bootstrap server 6 using the bootstrap certificate provisioned thereon, whereby S114 the bootstrap server 6 determines from the bootstrap certificate that the device is to be assigned a device account identifier and further determines whether the bootstrap certificate is trusted using the OEM certificate registered at the device management platform.

At S116 the bootstrap server 6 communicates with the enrolment service 46 to determine whether an enrolment identifier for the device 2 exists, and, therefore, verify that the device is eligible to be assigned a device account identifier. To perform such a determination, the bootstrap server 6 may generate an enrolment identifier check value, whereby in an illustrative example the enrolment identifier check value may comprise a fingerprint for the bootstrap certificate presented by the device 2. In a further illustrative example, the bootstrap server 6 may transmit the bootstrap certificate (or data therein) to the enrolment service 46 which may generate the enrolment identifier check value.

When the enrolment identifier exists, at S118, the enrolment service 46 assigns a device account identifier to the enrolment identifier for which there is a match, and at S120 provides the device account identifier to the bootstrap server 6. In other embodiments the bootstrap server 6 or another entity (e.g. a further service at the device management platform) may assign a device account identifier to the enrolment identifier for which there is a match.

When the enrolment identifier does not exist the enrolment service may return an error and the device will not be provisioned with a device account identifier.

At S122 the bootstrap server 6 provisions the device account identifier on the device 2.

At S124 the bootstrap server 6 creates a device profile or entry (hereafter "device profile") in a device directory 48 at the device management platform, and at S126, the bootstrap server 6 provisions a resource credential on the device 2, to enable the device 2 to, at S128, authenticate with the resource server 4, to access one or more services. Each device profile at the device directory corresponds to a device, and may inform the device management platform of the credential data available to the corresponding device and/or the one or more services to which the device is authorised to access. Each device profile may also include a list of the resources on the corresponding device so that a server or service can access the resources on the corresponding device.

When the enrolment identifier is already assigned to a device account identifier it will preferably not be assigned to any further device account identifiers.

Furthermore, each device owner may only be authorised to have a specific number of devices having account identifiers at a particular time. As such, the bootstrap server may check with the enrolment service as to whether the number of enrolment identifiers assigned to devices for that device owner has reached a threshold device limit. When the threshold device limit is reached, the device owner may be prompted to de-assign one or more devices before a new device account identifier will be assigned.

The enrolment identifier may expire after a period of time. For example, an enrolment identifier may expire if not assigned to a device account within 30 days, although the period may be any period dependent on device owner requirements. Once expired, the device presenting credential data matching an expired enrolment identifier will not be assigned a device account identifier, and the device owner may be prompted to request a new enrolment identifier e.g. from the OEM.

FIG. 4 illustratively shows an example process S200 in which a device owner 44 uploads a certificate to a device management platform via a portal 45.

As depicted in FIG. 4, the device owner can send data to, and receive data from, the device management platform via the portal 45.

At S202 the device owner 44 obtains a device from the OEM 42 and at S204 obtains OEM certificate. Although depicted as being obtained by the device owner in FIG. 4, the OEM certificate may also be pre-provisioned on the device 2 when obtained by the device owner. At S206 the device owner 44 uploads the OEM certificate to the device management platform via portal 45 (e.g. using a "POST" method).

At S208 the portal 45 registers the OEM certificate as a trusted CA with the bootstrap server 6. The OEM certificate may also be configured whereby information is added to enable the bootstrap server to determine that it is to be used in an enrolment process, and to provide details about the device owner (e.g. a device owner account identifier).

At S210 the portal 45 acknowledges to the device owner 44 that OEM certificate was registered as a trusted CA at the device management platform.

FIG. 5 illustratively shows an example process S300 in which the device owner 44 enrolls device 2 at enrolment service 46 device management platform.

At S302 the device owner 44 acquires enrolment identifier by following the instructions obtained by the device owner 44.

At S304 the device owner 44 uploads the acquired enrolment identifier for the device 2 to the portal 45. As above, the enrolment identifier may comprise one or more characters (e.g. ASCII characters, binary characters etc), and is preferably globally unique.

At S306, the portal 45 provides the enrolment identifier to the enrolment service 46, whereby at S308 the enrolment identifier is stored in a database (DB) thereat and linked to the device owner account.

At S310, the enrolment service 46 confirms to the device owner 44 (e.g. via portal 45) that the device is enrolled thereat. The confirmation at S310 may comprise a payload comprising inter alia data confirming the enrolment identifier and the time/date enrolment completed.

When the device 2 is enrolled it is ready to be bootstrapped to be assigned to an account at the device management platform and provisioned with a device account identifier for that account.

FIGS. 6a and 6b illustratively show a process S400 in which a device account is assigned to a device and associated credential data provisioned on the device 2 to enable the device access one or more services at the device management platform.

At S402 the device 2 is powered on after factory or master reset and initiates a bootstrap process with bootstrap server 6 by transmitting a bootstrap request comprising bootstrap data to authenticate with the bootstrap server 6. The bootstrap data may include including, for example, a device identifier (e.g. GUID, UUID etc.) and bootstrap certificate. As above, the bootstrap server 6 may determine (e.g. from code/text/data in the bootstrap certificate) that the device is to be assigned a device account identifier.

The bootstrap server 6 then determines whether the device is eligible to obtain a device account identifier whereby, at S404 bootstrap server 6 verifies, using the OEM certificate registered previously, that the bootstrap certificate is trusted (e.g. that it has a chain of trust to the OEM CA certificate.)

If the bootstrap certificate is not verified as being trusted then the bootstrap server 6 may determine that the device is not eligible and terminates the bootstrap process.

At S406, when the bootstrap certificate is verified at the bootstrap server 6, the bootstrap server 6 acknowledges to the device 2 that the bootstrap certificate was verified.

At S408 the bootstrap server 6 calculates an enrolment identifier check value. In the present illustrative example, the bootstrap server 6 may generate a fingerprint for the bootstrap certificate presented by the device 2.

At S410, the bootstrap server 6 communicates with the enrolment service 46 to determine whether an enrolment identifier for the device 2 exists.

When the enrolment identifier exists, the enrolment service assigns a device account identifier to the enrolment identifier for which there is a match, and at S412, the enrolment service 46 provides a payload which confirms a match and comprising inter alia the device account identifier to the bootstrap server 6.

At S414, the bootstrap server 6 requests that device directory 48 at the device management platform creates a device profile for the device 2 and confirms the status of the device 2 to confirm inter alia that the device is in a bootstrapped state, that the enrolment identifier check value matched the enrolment identifier. At S415 the device directory confirms that the device profile is created.

At S416 the bootstrap server 6 generates credential data for the device 2 to enable the device 2 to connect to the resource server 4, the credential data including the device account identifier, and at S418 and provisions the credential data on the device 2.

At S420 the bootstrap server 6 confirms with the enrolment service 46 that the enrolment identifier has been claimed and the device account identifier is provisioned on the device 2.

At S422, the device authenticates with the resource server 4 using the credential data including device account identifier provisioned thereon.

FIG. 7 illustratively shows an example process S500 in which the device owner 44 revokes an enrolment identifier for device 2 at device management platform.

At S502 the device owner sends a request to the portal 45 to delete the enrolment identifier for device 2. At S504 the portal 45 transmits the delete request to the enrolment service 46, which at S506 deletes the entry for the requested enrolment identifier from the database, and at S508 confirms the deletion to device owner (e.g. via portal 45).

Once an enrolment identifier has expired, the device will not be able to obtain a device account identifier and the bootstrap process will fail. In the case of an enrolment identifier having been revoked by a device owner and subsequently re-enrolled, the threshold time limit may be calculated from the time it was first enrolled. In other embodiments the threshold time limit may be calculated from the time it was re-enrolled.

In embodiments a device owner may be notified that the enrolment identifier has expired and request new credential data from the OEM (or another party) in order to obtain a new enrolment identifier.

In some embodiments, in the event of the bootstrap process failing, the device 2 may continue to retry the bootstrap process in accordance with settings thereon, whereby, for example, the device 2 may retry the bootstrap mechanism every "n" seconds, or the device 2 may use a back-off mechanism and retry at 1 sec, 2 sec, 4 sec. The device 2 may retry up to a maximum time (e.g. 1 week) at which point the device 2 will power off unless the bootstrap process is successful before then.

In embodiments the enrolment service will delete/remove invalid enrolment identifiers. FIG. 8 illustratively shows an example process S600 in which an enrolment identifier exceeds a threshold time limit before being claimed. The threshold time limit is set at 30 days in the present illustrative example.

At S602, the enrolment service 46 checks whether one or more enrolment identifiers in the database exceeds a threshold time limit, and if not, the enrolment service does not delete any enrolment identifiers. If an enrolment identifier has not been claimed before the expiration of the threshold time limit, the enrolment service deletes the enrolment identifier (or at least does not assign a device account identifier thereto).

FIG. 9 illustratively shows an example process S700 in which a device owner 44 can view its devices enrolled at the enrolment service 46.

At S702 the device owner 44 may require information on the number of enrolment identifiers available thereto and transmits a request to the portal 45 for one or more enrolment identifier(s) which is(are) enrolled at the enrolment service 46. In embodiments the device owner 44 may specify search criteria for the desired enrolment identifiers (e.g. time to expiry/number available to claim).

At S704 the portal 45 submits a request to the enrolment service 46 based on or in response to the device owner's request. At S706 the enrolment service 46 obtains the enrolment identifiers corresponding to the search criteria (e.g. from the database thereat). At S708 the enrolment service 46 returns to the device owner 44 (e.g. via portal 45) a payload comprising inter alia the list of requested enrolment identifiers corresponding to the search criteria.

As will be appreciated the techniques described above provide a way to assign and provision device account identifiers to devices in a secure manner. Should a rogue $3^{rd}$ party attempt to register a device with the device management platform, the device would not be capable of obtaining a device account identifier without the correct credential data (e.g. OEM certificate and bootstrap certificate.)

Furthermore, as the enrolment identifiers are linked to particular devices (e.g. via a device identifier (e.g. UUID) associated with the bootstrap certificate) the rogue $3^{rd}$ party would not be able to obtain a device account identifier for the hacked device as its device identifier would not match that associated with the bootstrap certificate which is used to generate the enrolment identifier.

Furthermore, the device may take different actions dependent on what data persists after a factory or master reset. As an illustrative example, the security object for the bootstrap server comprising credential data to enable the device to authenticate with the bootstrap server 4 may persist after reset, in which case the bootstrap server 6 will provide a security object comprising credential data to enable the device to authenticate with the resource server 4.

FIGS. 10a-10b illustratively show an example process 800 in which device 2 bootstraps after a reset (e.g. factory reset) whereby the security object for the bootstrap server and the resource server 4 are deleted, such that the device reverts to the bootstrap data as originally provided by the OEM without the device account identifier.

At S802 the device 2 is powered on after the reset and initiates a bootstrap process with bootstrap server 6 by transmitting a bootstrap request comprising bootstrap data to authenticate with the bootstrap server 6, wherein the bootstrap data may include a bootstrap certificate. As above, the bootstrap server 6 may determine (e.g. from code/text/data in the bootstrap certificate) that the device is to be assigned a device account identifier.

The bootstrap server 6 then determines whether the device is eligible to obtain a device account identifier whereby, at S804 the bootstrap server 6 verifies, using the OEM certificate registered previously, that the bootstrap certificate is trusted (e.g. that it has a chain of trust to the OEM CA certificate.)

If the bootstrap certificate is not verified as being trusted then the bootstrap server 6 may determine that the device is not eligible and terminate the bootstrap process.

At S806, when the bootstrap certificate is verified the bootstrap server 6 acknowledges to the device 2 that the bootstrap certificate was verified.

At S808 the bootstrap server 6 calculates an enrolment identifier check value. In the present illustrative example, the bootstrap server 6 may generate a fingerprint for the bootstrap certificate presented by the device 2 as the enrolment identifier check value.

At S810, the bootstrap server 6 communicates with the enrolment service 46 to determine whether an enrolment identifier for the device 2 exists.

When the enrolment identifier exists (e.g. when the enrolment identifier check value matches an expected value), the enrolment service assigns a device account identifier to the enrolment identifier for which there is a match, and at S812 the enrolment service 46 provides a payload which confirms a match and comprising inter alia the device account identifier to the bootstrap server 6.

At S814, the bootstrap server 6 requests that device directory 48 at the device management platform creates a device profile for the device 2 and confirms the status of the device 2 to confirm inter alia that the device is in a bootstrapped state. At S816 the device directory 48 updates the device profile for the device 2 confirms that the device profile was updated.

At S818 the bootstrap server 6 generates credential data for the device 2 to enable the device 2 to connect to the resource server 4, the credential data including the device account identifier, and at S820 provisions the credential data on the device 2.

At S822 the bootstrap server 6 confirms with the enrolment service 46 that the enrolment identifier has been claimed and the device account identifier is provisioned on the device 2.

At S824, the device authenticates with the resource server 4 using the credential data including device account identifier provisioned thereon.

In embodiments the device management platform may blacklist device identifiers such that a rogue $3^{rd}$ party will not be able to use a blacklisted device to authenticate with a resource server.

As the device identifier is linked to the enrolment identifier, such functionality means that a rogue $3^{rd}$ party will not be able to merely delete security objects on the device and re-enroll the device, as the enrolment identifier records will also need be to be deleted from the device management platform. As such, ownership disputes may be easily resolved by a party evidencing that they originally enrolled the device.

FIGS. 11a to 11c illustratively show an example process in which ownership of a device 2 is transferred from first device owner (A) 44 to a second device owner (B) 47, whereby the first device owner 44 has already enrolled the device, for example as described at FIGS. 4 to 6b above.

At S902, the second device owner 47 acquires the device 2 from the first device owner 44.

At S904 the first device owner 44 transmits a delete request to the portal 45 to revoke the enrolment identifier for device 2 from the enrolment service, and further transmits an identifier for the device (e.g. UUID).

At S906 the portal 45 transmits a request to the enrolment service 46 based on or in response to the first device owner's request. At S908 the enrolment service 46 deletes the entry for the requested enrolment identifier from the database and at S910 confirms the deletion to the first device owner 44 (e.g. via portal 45).

In an embodiment the second device owner 47 acquires (not shown) an OEM certificate from the OEM 42 and at S912 the second device owner 47 uploads the OEM certificate to the portal 45. In another embodiment the second device owner may obtain an OEM certificate from a different party other than the OEM 42. It will be appreciated that the second owner accesses an account at portal 45 which is different to the account accessed by first device owner 44.

At S914 the portal 45 registers the OEM certificate as a trusted CA with the bootstrap server 6. The OEM certificate may also be configured whereby information is added to enable the bootstrap server 6 to determine that it is to be used in an enrolment process, and to provide details about the second device owner 47 (e.g. a device owner account identifier).

At S916 the portal 45 acknowledges to the second device owner 47 that OEM certificate was successfully registered as a trusted CA.

At S918 the second device owner 47 obtains an enrolment identifier in any suitable manner (e.g. by following the instructions obtained by the device owner 47.)

At S920 the second device owner 47 uploads the acquired enrolment identifier for the device 2 to the portal 45.

At S922, the portal 45 provides the enrolment identifier to the enrolment service 46, whereby at S924 the enrolment identifier is stored and linked to the device owner account for the second device owner 47.

At S926, the enrolment service 46 confirms to the second device owner 47 (e.g. via an associated computing device) that the device 2 is enrolled thereat. The confirmation at S926 may comprise a payload (not shown) comprising inter alia data confirming the enrolment identifier and the time/date enrolment completed.

When the device 2 is enrolled it is ready to be bootstrapped to obtain a device account identifier.

At S928 the second 42 device owner resets the device 2 to cause, at S930, the device 2 to initiate a bootstrap process with bootstrap server 6, whereby the device 2 uses the bootstrap data to authenticate with the bootstrap server 6. As above, the bootstrap server 6 may determine (e.g. from code/text/data in the bootstrap certificate) that the device is to be assigned a device account identifier.

The bootstrap server 6 then determines whether the device is eligible to obtain a device account identifier whereby, at S932 the bootstrap server 6 verifies, using the OEM certificate registered previously, that the bootstrap certificate is trusted (e.g. that it has a chain of trust to the OEM CA certificate.)

If the bootstrap certificate is not verified as being trusted then the bootstrap server 6 may determine that the device is not eligible and return an error, terminating the bootstrap process.

At S934, the bootstrap certificate is verified with the bootstrap server 6 which, at S936, acknowledges to the device 2 that the bootstrap certificate was verified.

At S938 the bootstrap server 6 calculates an enrolment identifier check value. In the present illustrative example, the bootstrap server 6 may generate a fingerprint for the bootstrap certificate presented by the device 2.

At S940, the bootstrap server 6 communicates with the enrolment service 46 to determine whether an enrolment identifier for the device 2 exists.

When the enrolment identifier exists, the enrolment service assigns a device account identifier to the enrolment identifier for which there is a match, and at S942, the enrolment service 46 provides a payload which confirms a match and comprising inter alia the device account identifier to the bootstrap server 6.

At S944, the bootstrap server 6 requests that device directory 48 at the device management platform creates a device profile for the device 2 and confirms the status of the device 2 to confirm inter alia that the device is in a bootstrapped state, that the enrolment identifier check value matched the enrolment identifier. At S946 the device directory confirms that the device profile is created.

At S948 the bootstrap server 6 generates credential data for the device 2 to enable the device 2 to connect to the resource server 4, the credential data comprising the device account identifier, and at S949 and provisions the credential data on the device 2.

At S450 the bootstrap server 6 confirms with the enrolment service 46 that the enrolment identifier has been claimed and the device account identifier is provisioned on the device 2.

At S954, the device 2 authenticates with the resource server 4 using the credential data including device account identifier provisioned thereon.

Such functionality means that the ownership is readily transferrable from the first device owner A to second device owner B whilst mitigating any security risks because the device cannot readily be controlled by a rogue $3^{rd}$ party to access services at the device management platform without obtaining the OEM certificate and enrolment identifier from the OEM.

Communications between the various entities (e.g. device(s), server(s) service(s) may be secured in any suitable manner. For example, in FIG. 4 communications between the device owner 44 and the portal 45 may be secured using a session token or API key. Furthermore, communications between the portal 45 and enrolment service 46 may be secured using a JSON web token (JWT token). It will be appreciated that the examples of securing communications between entities are exemplary only and the claims are not limited in this respect.

In a further related aspect, the present techniques provide a non-transitory data carrier carrying code which, when implemented on a processor, causes the processor to carry out the method described herein.

The techniques further provides processor control code to implement the above-described systems and methods, for example on a general purpose computer system or on a digital signal processor (DSP). The techniques also provides a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended items.

The invention claimed is:

1. A computer implemented method of bootstrapping a device by a bootstrap server, the method comprising:
    receiving, at the bootstrap server from the device, bootstrap data comprising an enrolment identifier;
    sending, from the bootstrap server to a first service remote therefrom, a communication to determine whether the device is eligible to obtain a device account identifier based on or in response to the enrolment identifier;
    obtaining, at the bootstrap server from the first service, a device account identifier assigned to the device when it is determined that the device is eligible to obtain the device account identifier;
    provisioning, from the bootstrap server to the device, first credential data comprising the device account identifier assigned to the device to enable the device to authenticate with a resource server to access one or more services authorized for the device account associated with the device account identifier.

2. The method of claim 1, further comprising:
    provisioning, from the bootstrap server to the device, second credential data to enable the device to connect with a resource server.

3. The method of claim 1, wherein the bootstrap data comprises a device identifier for the device and a first certificate trusted by the bootstrap server.

4. The method of claim 3, wherein verifying that the device is eligible to obtain a device account identifier based on or in response to the bootstrap data comprises:
    checking the first certificate corresponds with the enrolment identifier associated with the device.

5. The method of claim 1, wherein verifying that the device is eligible to obtain the device account identifier based on or in response to the bootstrap data comprises:
    checking that the enrolment identifier does not exceed a threshold device limit.

6. The method of claim 1, wherein verifying that the device is eligible to obtain a device account identifier based on or in response to the bootstrap data comprises:
    checking that the enrolment identifier does not exceed a threshold time limit.

7. The method of claim 1, further comprising:
    creating a device profile for the device at a device directory.

8. The method of claim 1, wherein the first credential data further comprises a bootstrap server identifier associated with the device account identifier.

9. The method of claim 2, wherein the second credential data comprises a resource certificate associated with the device account identifier.

10. A computer implemented method of provisioning a device account identifier to a device, the method comprising:
   receiving, at a device management platform, bootstrap data comprising an enrolment identifier;
   verifying, at the device management platform, that the device is eligible to obtain the device account identifier based on or in response to the enrolment identifier;
   assigning, at the device management platform, a device account identifier to the device based on or in response to the determination that the device is eligible;
   provisioning, from the device management platform to the device, the device account identifier assigned to the device to enable the device to authenticate with a resource server to access one or more services authorized for the device account associated with the device account identifier.

11. The method of claim 10, further comprising:
   deleting, at the device management platform, the enrolment identifier when the enrolment identifier exceeds a threshold device limit or a threshold time limit.

12. The method of claim 11, further comprising:
   receiving, at the device management platform, a request to delete the one or more enrolment identifiers;
   deleting, at the device management platform, the one or more enrolment identifiers in response to the request.

13. The method of claim 10, wherein the enrolment identifier for the device comprises a fingerprint of a bootstrap certificate provisioned on the device.

14. The method of claim 10, wherein the device management platform comprises a database to store one or more identifiers and a service to assign the one or more identifiers to respective devices.

15. The method of claim 10, wherein the device management platform comprises a bootstrap server to provision the device account identifier on the device.

16. A computer implemented method of bootstrapping a device, the method comprising:
   transmitting, from the device to a bootstrap server, bootstrap data comprising an enrolment identifier;
   receiving, at the device from the bootstrap server, first credential data comprising a device account identifier assigned to the device to enable the device to authenticate with a resource server to access one or more services authorized for the device account associated with the device account identifier.

17. The method of claim 16, wherein the first credential data further comprises bootstrap data associated with the assigned account identifier.

18. The method of claim 16, further comprising: receiving, at the device from the bootstrap server, second credential data configured to enable the resource service to verify that the second credential data is authorized by an entity trusted by the resource service.

* * * * *